United States Patent [19]
Hayashi et al.

[11] Patent Number: 5,232,085
[45] Date of Patent: Aug. 3, 1993

[54] DISTILLATION SYSTEM WITH A HYDROPHOBIC POROUS MEMBRANE

[75] Inventors: Nobuatsu Hayashi, Abiko; Susumu Horiuchi, Hitachi; Hiroaki Yoda, Tsuchiura, all of Japan

[73] Assignee: Hitachi, Ltd., Tokyo, Japan

[21] Appl. No.: 735,817

[22] Filed: Jul. 25, 1991

[30] Foreign Application Priority Data

Aug. 1, 1990 [JP] Japan .................... 2-202573

[51] Int. Cl.⁵ .................... B01D 3/02; B01D 13/00
[52] U.S. Cl. .................... 202/182; 202/176; 202/197; 202/200; 202/202; 202/267.1; 159/DIG. 27; 159/DIG. 28; 203/10; 203/22; 203/23; 203/25; 203/26; 203/39; 203/40; 203/86; 203/89; 210/500.23; 210/500.25; 210/640
[58] Field of Search .................... 203/39, 40, 89, 26, 203/86, 10, 11, 22, 23, 25; 202/182, 197, 176, 200, 267.1, 236, 202; 159/DIG. 27, DIG. 28, 24.1; 210/640, 500.23, 500.25

[56] References Cited

U.S. PATENT DOCUMENTS

| | | | |
|---|---|---|---|
| 2,907,699 | 10/1959 | Millidge et al. | 203/86 |
| 3,660,246 | 5/1972 | Smith | 203/10 |
| 4,316,774 | 2/1982 | Trusch | 203/86 |
| 4,888,114 | 12/1989 | Gaddis | 210/500.25 |
| 4,953,694 | 9/1990 | Hayashi et al. | 202/180 |
| 4,981,590 | 1/1991 | Van'T Veen et al. | 210/500.25 |
| 5,133,837 | 7/1992 | Elmore et al. | 203/86 |

FOREIGN PATENT DOCUMENTS

| | | | |
|---|---|---|---|
| 55-25782 | 2/1980 | Japan | 203/86 |
| 55-85681 | 6/1980 | Japan | 203/86 |
| 2-63592 | 3/1990 | Japan | |

*Primary Examiner*—Wilbur Bascomb, Jr.
*Attorney, Agent, or Firm*—Antonelli, Terry, Stout & Kraus

[57] ABSTRACT

A distillation system has a degassing tank, a distiller for generating vapor of raw water taken from the degassing tank, a heater for heating the vapor from the distiller to convert the vapor into a high temperature and pressure vapor, a hydrophobic porous membrane through which the vapor from the heater flows, and a heat transfer unit provided in the distiller for effecting heat exchange between the vapor from the membrane member and the raw water from the degassing tank. The structural elements such as the heat exchange unit, piping, etc., with which the vapor from the membrane or the condensate thereof is brought into contact are made of titanium or titanium alloy.

9 Claims; 3 Drawing Sheets

5,232,085

DISTILLATION SYSTEM WITH A HYDROPHOBIC POROUS MEMBRANE

BACKGROUND OF THE INVENTION

1. Field of the Invention

This invention relates to a system for distilling water from raw water or the like which is treated by passage through an ion exchange or reverse osmosis membrane, and more particularly to a system for distilling water suitable for use in the fields of semiconductor manufacturing, electronics industry, medical supply production, medical treatment and the like.

2. Description of the Prior Art

It has been known to distil water of high purity by making vapor pass through a hydrophobic porous membrane as disclosed in Japanese Patent Unexamined Publication No. 2-63592.

In the prior art described above, in which the vapor is generated by heating raw water as it is and is condensed into condensate, the vapor may be contaminated by impurities including corpuscles, dissolved gas and total organic carbon (TOC) in the raw water as well as water mist. Accordingly, when the vapor is condensed by cooling, these impurities contaminate the distilled water to thereby deteriorate the purity thereof.

Furthermore, since the generated vapor is condensed to afford the latent heat of vaporization to a coolant and not reused, the efficiently is low and it is still required to provide a subsidiary equipment for serving to supply the coolant.

Moreover, in the plant designed to transfer the produced distilled water by means of a pump, there is a disadvantage that the corpuscles or organic material resulting from a sliding portion of the pump deteriorate the water composition chemistry.

In addition, there is another disadvantage that impurities dissolved from the various structural elements making up the distillation system contaminate the produced vapor and distilled water, thereby making it impossible to obtain the distilled water of high purity required for the use in semiconductor manufacturing and other like.

An object of the present invention is to provide a distillation system capable of distilling water of very high purity which is suitable for use in the fields of semiconductor manufacturing, electronics industry, medical supply production, medical treatment and the like.

Another object of the present invention is to provide a distillation system which is capable of lessening dissolution of impurities from the structural elements making up the system thereby producing distilled water of high purity.

SUMMARY OF THE INVENTION

An outstanding feature of the present invention resides in a distillation system for obtaining distilled water from raw water wherein vapor generated during the distillation is passed through an ion exchange or reverse osmosis membrane, which system comprises a hydrophobic porous membrane through which vapor of the raw water flows, and structural elements such as heat exchange elements, pipes and the like, with which vapor from the membrane or distilled water obtained by condensing the vapor from the membrane is brought into contact, are made of titanium or titanium alloy.

Another feature of the present invention resides in a distillation system comprising means for generating vapor by heating raw water, a hydrophobic porous membrane through which the vapor flows disposed in a vapor flow passage leading from the vapor generating means, and structural elements with which vapor from the hydrophobic porous membrane or condensate thereof is brought into contact are made of titanium or titanium alloy.

Still another feature of the present invention resides in a distillation system for distilling water from raw water comprising means for generating vapor by heating the raw water, means for heating the vapor to form a high temperature and pressure vapor, a device having a hydrophobic porous membrane through which the high temperature and pressure vapor flows, and a heat transfer unit provided in the vapor generating means for effecting heat exchange between the vapor passed through the hydrophobic porous membrane and the raw water so as to vaporize the raw water as well as to condense the vapor, wherein the structural elements, with which the vapor passed through the membrane or the condensate is brought into contact, are made of titanium or titanium alloy.

Further feature of the present invention resides in a distillation system comprising means for distillating water from raw water, a pipeline through which the distilled water flows, and a pressure source for feeding the distilled water through the pipeline, wherein each structural element of the system, with which the distilled water is brought into contact, is made of titanium.

DESCRIPTION OF THE PREFERRED EMBODIMENTS

Figure 1:
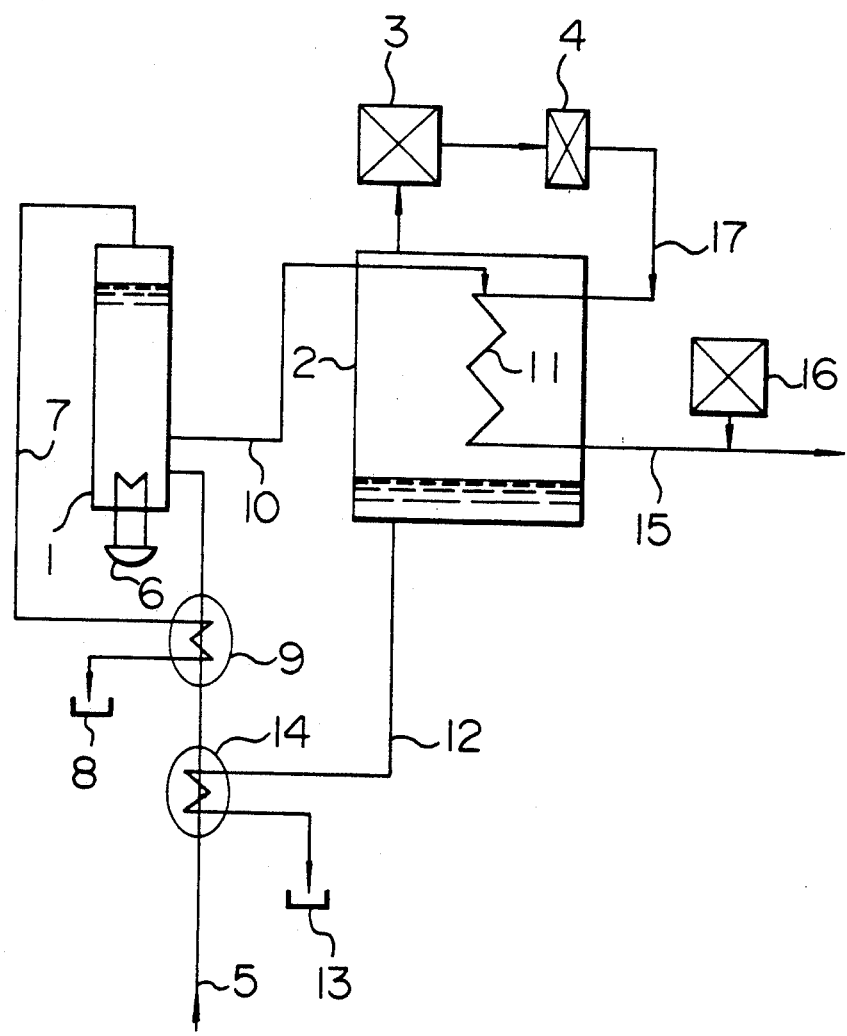
FIG. 1 is a general block diagram of an embodiment of the present invention.

Referring to FIG. 1, a distillation system according to an embodiment of the present invention comprises a degassing tank 1, a distiller 2, a heating device 3, and a hydrophobic porous membrane containing device 4. Raw water treated through a reverse osmotic membrane or ion-exchange resin is to be supplied to the degassing tank 1 through a pipeline 5. The raw water in the degassing tank 1 is heated by a heater 6 so as to separate dissolved gas and TOC and hot water from the raw water. Vapor containing the separated dissolved gas and the like flows through a pipeline 7 to a drain tank 8 while serving to heat the raw water through a heat exchanger 9. The hot water is fed from the degassing tank 1 through a pipeline 10 to the distiller 2 and then is jetted onto a heating surface of a heat transfer unit 11. The heat transfer unit 11 is a thin film evaporation type heat exchanger in which the hot water is brought into contact with the heating surface in the form of thin film so as to evaporate in thin film. Part of the hot water which fails to evaporate at the heating surface is collected in a bottom portion of the distiller 2 and discharged through a pipeline 12 to a drain tank 13 while serving to heat the raw water through a heat exchanger 14.

Vapor generated in the distiller 2 is heated by the heating device 3 so as to become a high temperature and high pressure vapor, and this vapor then is made to pass through the hydrophobic porous membrane device 4. At this time, the vapor can be freed of organic matter and water mist. The vapor then flows through an interior of the heat transfer unit 11 so as to be heat exchanged with hot water, and then condensed into condensate. The latent heat of condensation evaporates the hot water jetted onto the heating surface. Condensate produced by condensation in the interior of the heat transfer unit 11 is fed through a pipeline 15 by the action of the vapor pressure. In this case, if the pressure is insufficient, the condensate can be fed with the aid of the pressure of gas from a high purity inert gas feeder 16. The components or structural elements with which the vapor from the hydrophobic porous membrane of the hydrophobic porous membrane device 4 as well as distilled water obtained by condensation of the vapor, are brought into contact, such as the heat transfer unit 11 and the pipelines 15, 17, are all made of titanium or titanium alloy. Such titanium-containing components are prevented from dissolving into the vapor and the distilled water.

Further, since the above-described components are made of titanium or titanium alloy, the system can be reduced in weight so that the strength to system weight (specific strength) can be improved as well. In addition, since the heat transfer unit 11 is made of titanium or titanium alloy, the heat conductivity can be improved as well as the strength can be increased as compared with the case of using stainless steel. It is therefore possible to reduce the thickness of the tube wall of the heat transfer unit, thereby making it possible to far increase the general coefficient of heat-transfer.

Figure 2:
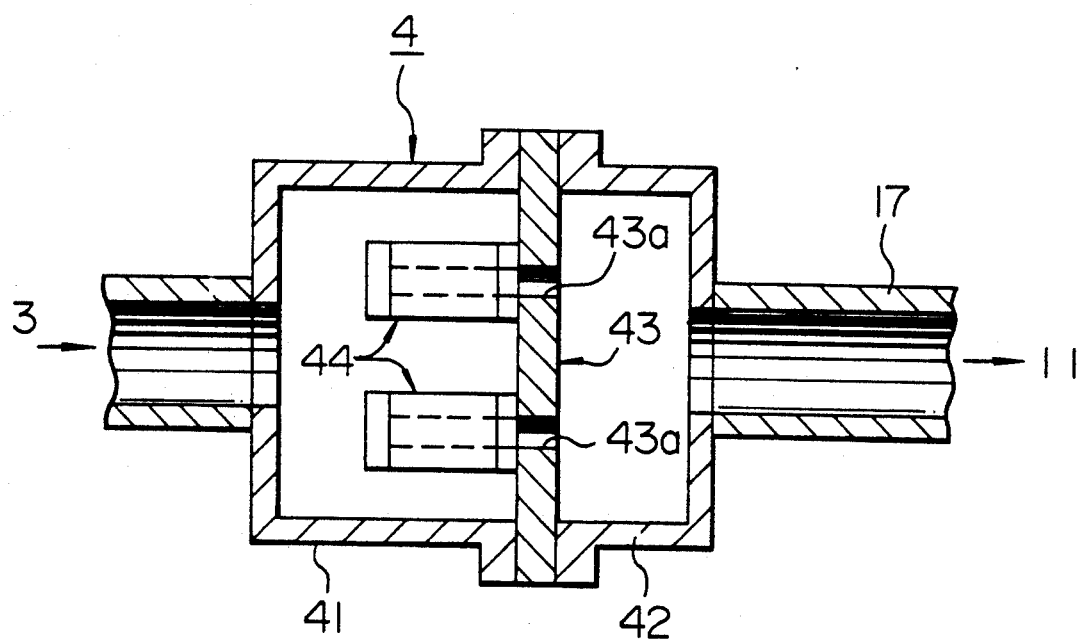
FIG. 2 is a vertical sectional view showing in detail the structure of a hydrophobic porous membrane device of FIG. 1.

Referring to FIG. 2, the membrane device 4 comprises an inlet case or housing 41 which is connected with the heating device 3 and through which the vapor enters into the device 4, an outlet case or housing 42 which is connected with the heat transfer unit 11 and through which the vapor flow out of the device, a partition plate 43 interposed between the inlet and the outlet housings 41, 42 and provided with a plurality of holes 43a through which the vapor flows, and hydrophobic porous membrane members 44 mounted on the plate 43 to cover the holes 43a respectively.

Figure 3:
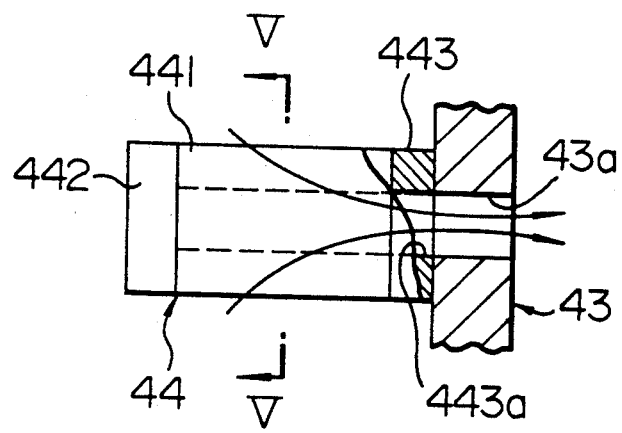
FIG. 3 is an enlarged fragmentary partially sectional view showing one of hydrophobic porous membrane members of FIG. 2.
Figure 4:
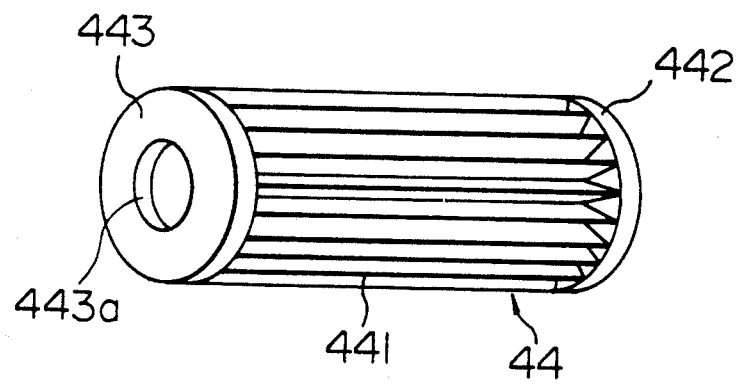
FIG. 4 is an enlarged perspective view showing the hydrophobic porous membrane member.
Figure 5:
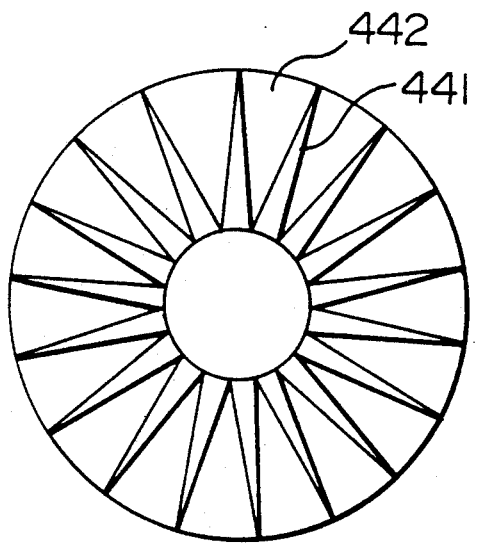
FIG. 5 is a view as seen along the line V—V of FIG. 3.

Each hydrophobic porous membrane member 44 is constituted, as shown in FIGS. 3 to 5, by a tubular corrugated hydrophobic porous membrane 441 and end disks 442, 443 serving to hold the opposite ends of the cylindrical porous membrane 441. The end disk 443 is formed at the center thereof with a through hole 443a. The membrane member 44 is mounted on the partition plate 43 in such a manner that the through hole 443a is aligned with the hole 43a. In consequence, the vapor flowing into the inlet case 41 is made to pass through the hydrophobic porous membrane 441 as indicated by arrows in FIG. 3 and, then, to flow into the outlet case 42.

In the present invention, the components with which the vapor from the hydrophobic porous membranes 441 as well as the condensate of the vapor (distilled water) are brought into contact are all made of titanium (Ti) or titanium alloy. More specifically, the end plates 442, 443 serving to hold the hydrophobic porous membranes 441, the partition plate 43, the outlet case 42, the pipeline 17, the heat transfer unit 11 and the pipeline 15 are all made of Ti or Ti alloy.

With the above construction, the following functions and effects can be achieved.

First, the raw water is subjected to degassing in the degassing tank 1 so that the dissolved gases (for example carbon dioxide gas, oxygen gas and nitrogen gas) and TOC (total organic carbon) in the raw water can be removed.

Further, since the vapor from the distiller 2 is heated to form a high temperature and high pressure vapor by means of the heating device 3, such as a compressor, an ejector or a heater, and heat-exchanged with the hot water from the degassing tank 1 and then condensed, cooling water is not required for condensing the vapor. The condensate is to be fed through the pipeline 15 as distilled water. The distilled water is fed by the action of the pressure of the high temperature and high pressure vapor. If the pressure is insufficient, however, the distilled water is to be fed with the aid of the pressure of a gas from the high purity inert gas feeder 16. As has been described above, according to this embodiment, since the distilled water can be fed without using any mechanical pump, it is possible to prevent contamination of organic matter from the sliding portions in the pump. Further according to the present embodiment, the components, with which the vapor from the hydrophobic porous membranes 441 as well as the condensate of the vapor (distilled water) are brought into contact, are all made of titanium or titanium alloy. Therefore, it is possible to prevent completely or reduce greatly the dissolution of impurities from such components into the vapor or distilled water. In addition, according to the present embodiment, since the heat transfer unit 11 is constituted by the thin film evaporation type heat exchanger, the general coefficient of heat transfer is increased as compared with the case of using immersion type heat exchanger, with the result that it is possible to decrease the heating surface area and hence to reduce the size of the system.

What is claimed is:

1. A distillation system for distilling water from raw water comprising:

means for heating raw water and for generating a vapor therefrom;

means for heating said vapor to provide a vapor having high temperature and pressure;

a device comprising a hydrophobic porous membrane through which said high temperature and high pressure vapor flows; and a heat transfer unit provided in said vapor generating means for effecting heat exchange between the vapor passed through said hydrophobic porous membrane and said raw water to vaporize said raw water and to condense said vapor, wherein structural elements of the device, which said vapor passed through the membrane or condensate of the vapor is brought into contact with, are made of titanium or titanium alloy; and wherein said device comprises an inlet housing to which the vapor of said raw water is supplied, an outlet housing connected with said heat transfer unit, a partition plate interposed between said inlet and said outlet housings and provided with a passage through which the vapor flows, and said hydrophobic porous membrane being mounted on said partition plate.

2. A distillation system according to claim 1, wherein said hydrophobic porous membrane is a tubular corrugated hydrophobic porous membrane and said device further comprises end plates serving to hold opposite ends of said tubular corrugated hydrophobic porous membrane, said hydrophobic porous membrane being so mounted on said partition plate as to cover the passage therethrough.

3. A distillation system according to claim 2, wherein said end plates serving to hold said hydrophobic porous membrane, said partition plate said outlet housing, a pipeline connected with said outlet housing, and said heat transfer unit are made of titanium.

4. A distillation system according to claim 1, further comprising a pipeline through which distilled water obtained by condensation at said heat transfer unit is fed, said pipeline being made of titanium.

5. A distillation system according to claim 2, further comprising an additional pipeline through which distilled water obtained by condensation at said heat transfer unit is fed, said pipeline being made of titanium.

6. A distillation system according to claim 3, further comprising an additional pipeline through which distilled water obtained by condensation at said heat transfer unit is fed, said additional pipeline being made of titanium.

7. A distillation system according to claim 4, wherein a high purity inert gas feeder is connected to said pipeline to feed the distilled water.

8. A distillation system according to claim 5, wherein a high purity inert gas feeder is connected to said pipeline to feed the distilled water.

9. A distillation system according to claim 6, wherein a high purity inert gas feeder is connected to said additional pipeline to feed the distilled water.

* * * * *